July 9, 1957 S. H. RASKIN 2,798,590
DIRECTION-CHANGING DEVICE FOR CONVEYOR
Filed Sept. 10, 1954 4 Sheets-Sheet 1
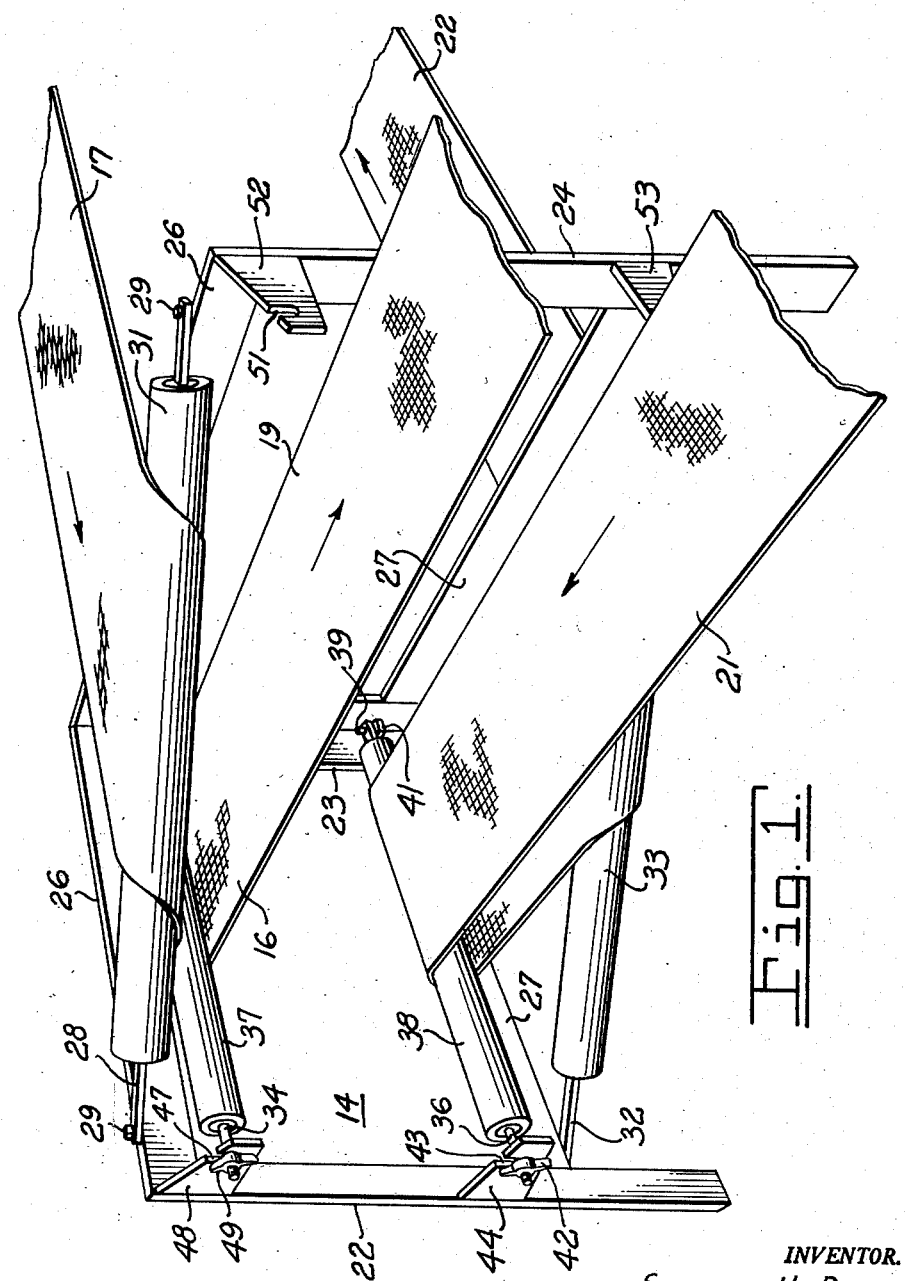
INVENTOR.
SEYMOUR H. RASKIN
BY
Zugelter & Zugelter
Attys.

July 9, 1957  S. H. RASKIN  2,798,590
DIRECTION-CHANGING DEVICE FOR CONVEYOR
Filed Sept. 10, 1954  4 Sheets-Sheet 2

INVENTOR.
SEYMOUR H. RASKIN
BY Jugelter & Jugelter
Attys.

July 9, 1957  S. H. RASKIN  2,798,590
DIRECTION-CHANGING DEVICE FOR CONVEYOR
Filed Sept. 10, 1954  4 Sheets-Sheet 3
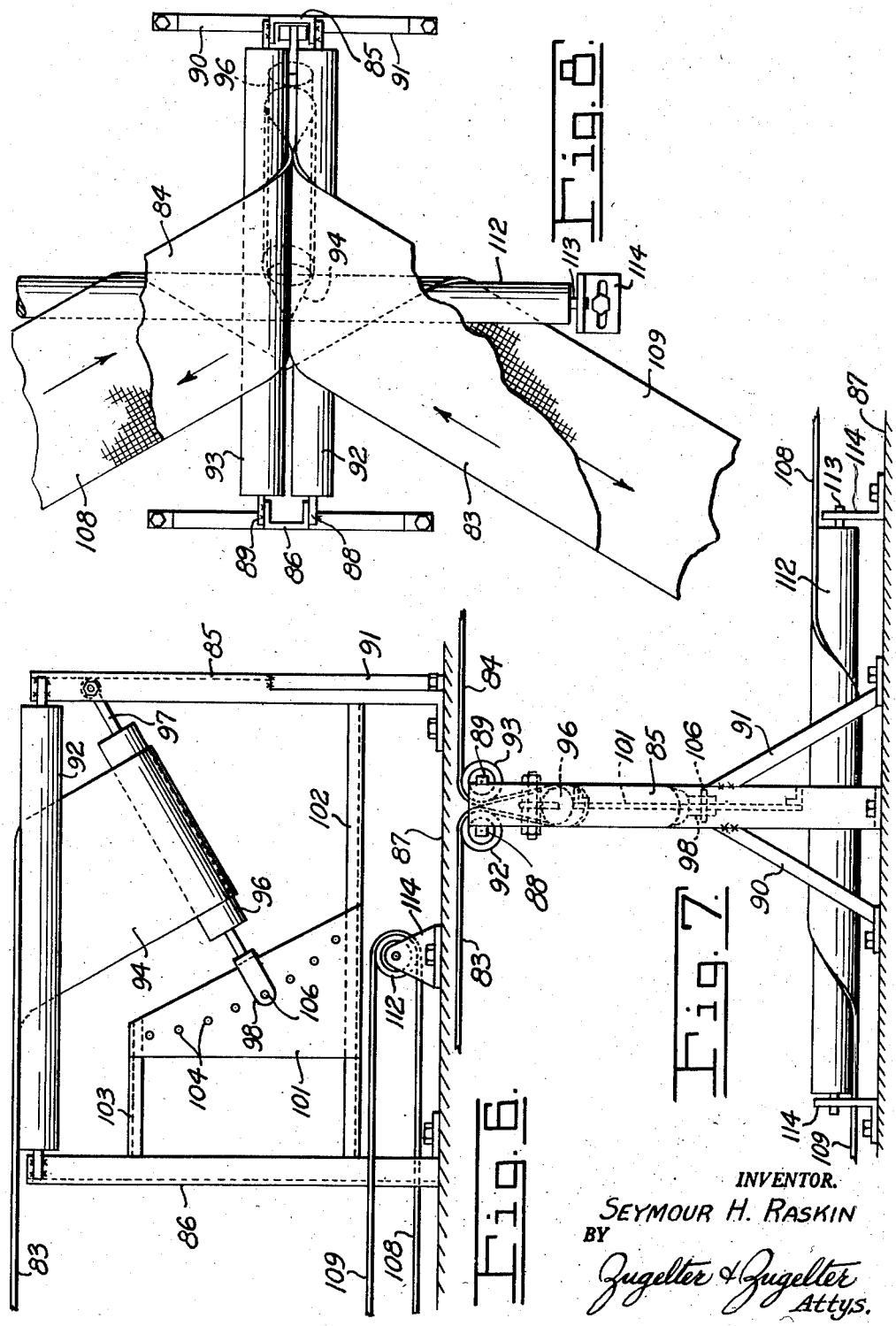
INVENTOR.
SEYMOUR H. RASKIN
BY
Zugelter & Zugelter
Attys.

July 9, 1957 S. H. RASKIN 2,798,590
DIRECTION-CHANGING DEVICE FOR CONVEYOR
Filed Sept. 10, 1954 4 Sheets-Sheet 4
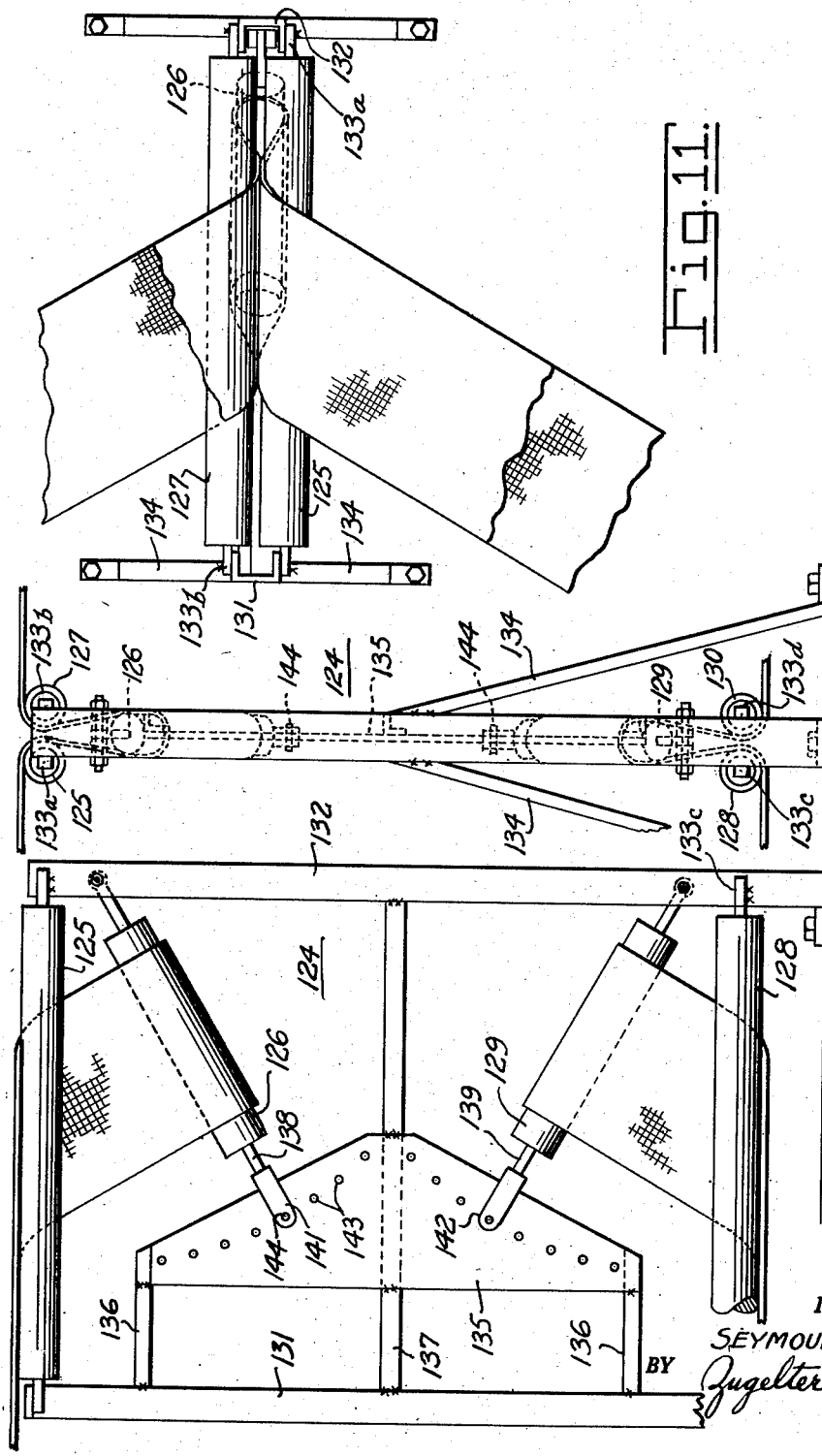
INVENTOR.
SEYMOUR H. RASKIN
BY 
Attys.

United States Patent Office 2,798,590
Patented July 9, 1957

2,798,590

DIRECTION-CHANGING DEVICE FOR CONVEYOR

Seymour H. Raskin, Cincinnati, Ohio

Application September 10, 1954, Serial No. 455,263

1 Claim. (Cl. 198—184)

This invention relates to belt conveyors. More particularly, this invention relates to a device for changing the direction of an endless belt conveyor.

An object of this invention is to provide a device which can be inserted in the run of a belt conveyor to provide an angled turn in the conveyor.

A further object of this invention is to provide a device of this type which can be inserted in the run of the belt without cutting the belt.

A further object of this invention is to provide a device of this type which divides the belt into an incoming course and an outgoing course so arranged that the incoming course overlies the outgoing course, and granular material on the incoming course is discharged onto the outgoing course.

A further object of this invention is to provide a device of this type having incoming and outgoing courses which are coplanar, so that packages can be discharged from the incoming course onto the outgoing course.

A further object of this invention is to provide a device for mounting in the run of a belt conveyor to provide a turn of selected or predetermined angle.

The above and other objects and features of the invention will in part be apparent and will in part be obvious to those of ordinary skill in the art to which the invention pertains, from the following detailed description and the drawings, in which:

Figure 1 is a perspective view of a belt conveyor and a direction changing device for the belt thereof constructed in accordance with an embodiment of this invention;

Fig. 6 is a view in front elevation of a device constructed in accordance with another embodiment of this invention, the device being shown in association with a belt conveyor;

Fig. 7 is a view in end elevation of the device and conveyor illustrated in Fig. 6;

Fig. 8 is a plan view of the device and conveyor illustrated in Fig. 6;

Fig. 9 is a view in front elevation of a device constructed in accordance with another embodiment of the invention, a belt conveyor being shown in association therewith;

Fig. 10 is a view in front elevation of the device and belt conveyor illustrated in Fig. 9; and Fig. 11 is a plan view of the belt conveyor and device illustrated in Fig. 9.

In the following detailed description, and the drawings, like reference characters indicate like parts.

Figures 4, 5:
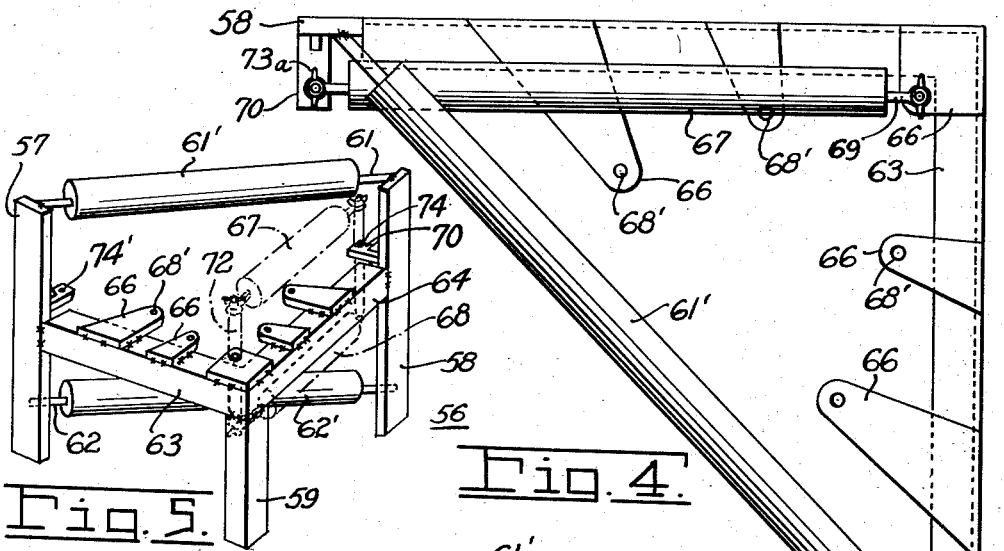
Fig. 4 is a plan view of the device illustrated in Fig. 2.
Fig. 5 is a perspective view of the device illustrated in Fig. 2.
Figure 3:
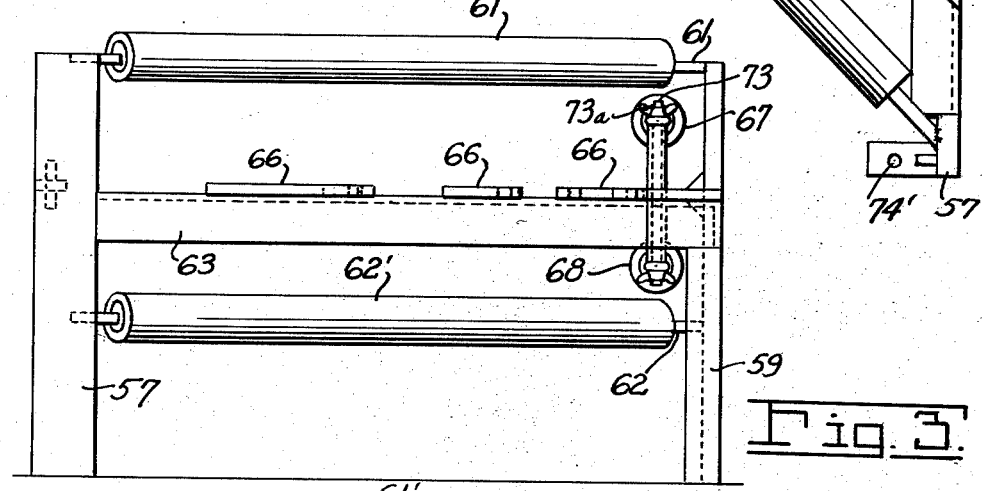
Fig. 3 is a view in end elevation of the device illustrated in Fig. 2.

In Fig. 1 is illustrated a direction changing device 14 for an endless belt conveyor 16. As indicated by arrows in the drawing, the belt conveyor 16 includes an incoming course or reach 17, an outgoing course or reach 19, an incoming return course or reach 21 and an outgoing return reach 22.

The direction changing device 14 includes posts 22, 23, and 24. The posts are connected together to form a right angle shaped framework by means of upper horizontal frame members 26, and lower horizontal frame members 27. The upper horizontal frame members 26 meet at right angles at post 23 and support a shaft 28 which extends across the long side of the frame work and is rigidly held in place on the frame members 26 by bolts 29. The shaft 28 carries a roller 31 which is rotatably mounted thereon. A similar return shaft 32 is mounted on the lower frame members 27 and carries a return roller 33 rotatably mounted thereon.

Removable shafts 34 and 36 are mounted on the framework adjacent the rollers 31 and 33, and rollers 37 and 38 are rotatably mounted on the removable shafts 34 and 36, respectively. One end of the shaft 36 is mounted on a pin 39. The pin 39, in turn, is mounted on a bracket 41, and the bracket 41 is mounted on the upright post 23. The other end of the shaft 36 is threaded and carries a wing nut 42. The threaded end of the shaft 36 may be received in a slot 43 of a bracket plate 44. When the shaft is mounted in the slot 43, the wing nut 42 may be drawn up to hold the removable shaft 36 tightly in position with the roller 38 adjacent but spaced from the roller 33 a sufficient distance to let the belt extend between the rollers. The roller 38 extends transversely of the roller 33 and at an angle of approximately 45° thereto. The roller 37 and its shaft 34 are similarly mounted. One end (not shown) of the shaft 34 is pivotally mounted on the post 23, and the other end of the shaft 34 is received in a slot 47 in a bracket 48. A wing nut 49 on the end of shaft 34 holds the shaft 34 firmly in position.

As shown, the rollers 31 and 37 are spaced a sufficient distance to let the belt 16 be threaded between the rolls as shown. When the belt is to be threaded, the wing nut on shaft 34 is released and the shaft 34 and roller 37 may be swung free to permit ready threading of the belt. Similarly, roller shaft 36 and roller 38 may be released and swung back to permit threading of the belt. The rollers extend transversely of each other and at an angle of about 45° to each other so that the incoming course 17 of the belt discharges above the outgoing course 19. With this arrangement, granular material (not shown) on the course 17 is discharged onto the outgoing course 19 and is transported away at an angle of approximately 90° to the incoming course.

The device may be inserted in a belt conveyor without breaking or cutting the conveyor. For this purpose, the roller shafts 34 and 36 are released from their supporting brackets, whereupon the belt may readily be threaded between the rollers to the position shown.

The device illustrated in Fig. 1 is intended to provide a 90-degree turn in the conveyor in a selected direction. If it is desired to make a 90-degree turn in the opposite direction, the movable shafts 34 and 36 may be released and swung to a position in which the threaded end of the shaft 34 rests in a slot 51 in a bracket 52 and the threaded end of the shaft 36 is received in a slot (not shown) in a bracket 53. When the rollers 33 and 37 are in this alternate position, the device may be used to form a right angle turn in a belt in a direction opposite to that shown.

The rollers of the device may be of the type having internal bearings rotatably mounting the rollers on the shafts thereof.

In Figs. 2, 3, 4 and 5 is shown a device 56 which is generally similar to the device shown in Fig. 1, but differs in that the device of Figs. 2-5 inclusive is provided with adjustably mounted rollers so that turns of preselected angles may be provided. The device of Figs. 2-5 inclusive includes a framework having upright frame posts 57 and 58 and a side post 59. The posts 57 and 58 are connected together by shafts 61 and 62 which are welded or otherwise firmly attached to the posts 57 and 58. The shafts 61 and 62 rotatably support rollers 61' and 62', respectively. In addition, the posts 57 and 58 are connected by a side frame of right angle configuration which includes angle members 63 and 64. The angle members 63 and 64 extend from posts 57 and 58, respectively, to post 59. A plurality of mounting plates 66 are attached to the members 63 and 64. The plates 66 form supports for transverse rollers 67 and 68. Each of the plates 66 is provided with an upright opening 68'.

Figure 2:
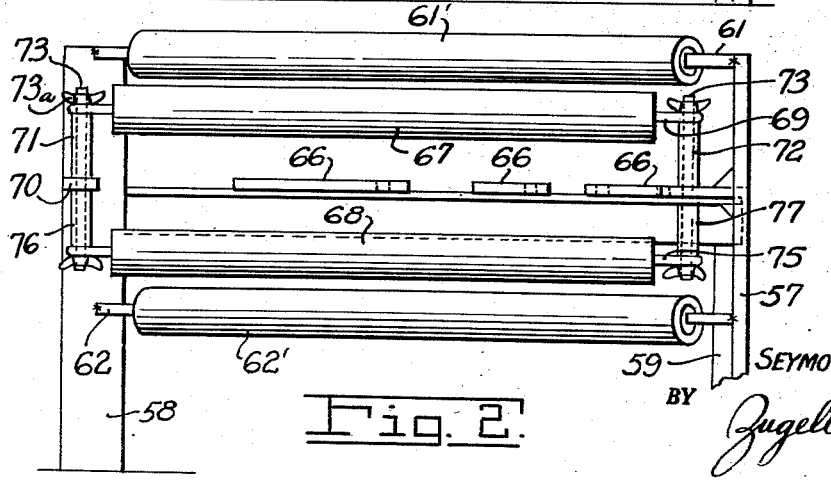
Fig. 2 is a view in front elevation of a direction changing device constructed in accordance with another embodiment of the invention.

As shown in Fig. 2, roller 67 is rotatably mounted on a shaft 69. The projecting ends of shaft 69 are secured to and supported by a leg or plate 70 and a selected one of the plates 66 by means of tubular spacers 71 and 72, and through bolts 73, the upper ends of the bolts being received in eyes at the ends of the shaft 69. The spacers are held in compression by means of nuts 73a on the ends of the bolts 73. The spacers 71 and 72 may be welded to the ends of the shaft, if necessary. The spacer tube 72 may be mounted on a selected one of the plates 66 to alter or vary the angle between roller 67 and roller 61'. As shown, plate 70 is mounted on post 58 and is provided with an opening 74 for receiving one of the through bolts. A similar plate 74' is mounted on post 57 and can similarly be used for supporting one end of the shaft 69 of roller 67.

Roller 68 is similarly mounted on a shaft 75 which carries similar tubular spacers 76 and 77. When the rollers 67 and 68 are mounted, as shown, at selected locations on plates 66 and 70, the required angular disposition of the rollers can be effected.

As will be clear from Figs. 4 and 5, the movable rollers 67 and 68 (not shown in Fig. 4) may be mounted in any of several preselected positions to vary or alter the angle between the rollers 61' and 62', and the rollers 67 and 68, respectively, and thereby adjust the angles at which courses or reaches of the belt travel.

The device shown in Figs. 2-5 inclusive, like the device of Fig. 1, is intended for use with granular material, or the like, which is carried on an incoming course or reach of a belt from which it is discharged onto an outgoing reach of a belt. In Figs. 6-8 inclusive is shown a device for use in transporting packaged articles and the like. In the device of Figs. 6-8 inclusive, a belt is provided having an incoming course 83 and an outgoing course 84 which are coplanar. The device of Figs. 6-8 inclusive includes upright posts 85 and 86 which are bolted to a floor 87 and which are spanned at their upper ends by a pair of parallel closely spaced shafts 88 and 89 which are of equal height above the floor. The ends of the shafts 88 and 89 are welded or otherwise firmly attached to the sides of the posts 85 and 86. Side struts 90 and 91 are attached to the post 85 to give the framework lateral support.

The courses of the belt extend over rollers 92 and 93, which are mounted on the shafts 88 and 89, respectively. From the rollers, the courses of the belt extend downwardly between the rollers, as indicated in Figs. 6 and 7 to form a loop 94. The loop 94 in the belt between the rollers 92 and 93 passes over a sloping roller 96. The sloping roller 96 is mounted on a shaft 97 which is pivotally mounted on upright post 85. The free end of the shaft 97 is provided with a clevis 98 which embraces an edge of an upright triangular plate 101.

Plate 101 is mounted between the posts 85 and 86 on cross members 102 and 103. As shown in Fig. 6, cross member 102 spans the posts below the plate 101. The cross member 103 extends from post 86 to the plate 101. The plate 101 is provided with a plurality of openings 104, each of which is adapted to receive a pin 106 with the pin extending through the clevis jaws. The sloping roller 96 may be mounted in various angled positions in order to permit the courses of the belt to intersect at various angles. As shown, the falls of the loop extend perpendicularly to the sloping roller and the angle between the courses 83 and 84 of the belt is twice the angle between the axis of the sloping roller and the horizontal, the latter angle being an acute angle.

Return courses 108 and 109 of the belt pass over a roller 112. The roller 112 is mounted on a shaft 113. The ends of the shaft 113 are received in upright brackets 114 which are mounted on the floor 87.

The return courses of the belt cross at the roller 112. The upper or main courses 83 and 84 of the belt are coplanar and are adapted to transfer packages of goods (not shown) from one course to the other in order to change the direction of travel of the packages.

The device shown in Figs. 6-8 inclusive is provided with a single return roller 112 which is different in construction from the rollers over which the main or operative courses of the belt pass. In Figs. 9-11 inclusive is shown a device 124 having an upper set of rollers 125, 126, and 127, which are similar in construction and arrangement to rollers 128, 129, and 130, over which return courses of the belt pass. The upper set of rollers includes two horizontal rollers 125 and 127 and an inclined or sloping roller 126. Similarly, the lower set of rollers includes two horizontal rollers 128 and 130 and an inclined or sloping roller 129.

The device of Figs. 9-11 inclusive includes upright posts 131 and 132 which are connected together by horizontal shafts 133a, 133b, 133c and 133d. The shafts are welded to the upright posts 131 and 132. In addition, side frame members 134 are attached to post 132 to steady the posts.

A plate 135 is mounted on frame members 136 and 137. The frame member 137 spans the posts 131 and 132, while the frame members 136 are mounted on post 131. The inclined rollers 126 and 129 are mounted on shafts 138 and 139, respectively. The shafts are pivotally mounted on post 132. Shafts 138 and 139 carry clevises 141 and 142, respectively, which embrace the plate 135. The plate is provided with openings 143. Pins 144 span the clevis jaws and extend through selected ones of the openings 143 to hold the inclined roller shafts in selected positions.

If desired, guard rails, retaining walls, or the safety or spillage preventing devices of the type which are common in the conveyor art may be mounted along the reaches of the belts or at the points of transfer to prevent material from spilling off the reaches of the belts.

The devices shown in the drawings and described above serve to put a turn in a conveyor belt in such a manner that the same belt forms both the incoming course and the outgoing course at the turn.

The devices illustrated in the drawings and described above are subject to structural modification without departing from the spirit and scope of the appended claim.

Having described my invention, what I claim as new and desire to secure by Letters Patent is:

A direction-changing device for a conveyor belt which comprises a pair of upright posts, a pair of vertically spaced main horizontal roller shafts spanning the posts, rollers rotatably mounted on said shafts, a substantially horizontal side frame extending between the posts and to one side thereof, a plurality of horizontal, substantially coplanar plate members mounted on said side frame, each of said plate members having an upright opening therein, a pair of removable roller shafts mounted on said plates, each of said movable roller shafts comprising a shaft member and tube members mounted on opposite ends of the shaft member and extending perpendicularly thereto, each of said movable shafts spanning two of the plates with the tube members aligned with the openings of said plate and with one of the movable shafts being above and the other of the movable shafts being below the plates, and pin means removably extending through the tubes and through the openings in said two of the plates to hold the movable shafts horizontal and spaced from the main shaft and extending transversely thereof at an acute angle thereto, and rollers on the movable shafts, the belt being threaded through the rollers to provide an incoming belt course discharging over the uppermost main roller and an outgoing course coming off the lower side of the movable roller adjacent and below the uppermost main roller, the incoming course discharging onto the outgoing course.

References Cited in the file of this patent

UNITED STATES PATENTS

| | | |
|---|---|---|
| 2,128,594 | Rasmussen | Aug. 30, 1938 |
| 2,222,019 | Buchanan | Nov. 19, 1940 |

FOREIGN PATENTS

| | | |
|---|---|---|
| 635,157 | Germany | Sept. 11, 1936 |